United States Patent
Kamangar

(10) Patent No.: US 9,633,114 B1
(45) Date of Patent: Apr. 25, 2017

(54) INBOX FOR TASK MANAGEMENT

(75) Inventor: Salar Kamangar, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/315,120

(22) Filed: Dec. 8, 2011

(51) Int. Cl.
*G06F 17/30* (2006.01)
*G06F 7/00* (2006.01)

(52) U.S. Cl.
CPC .. *G06F 17/30864* (2013.01); *G06F 17/30707* (2013.01)

(58) Field of Classification Search
None
See application file for complete search history.

(56) References Cited

U.S. PATENT DOCUMENTS

| | | | |
|---|---|---|---|
| 2002/0016734 A1* | 2/2002 | McGill et al. | 705/14 |
| 2004/0109025 A1* | 6/2004 | Hullot et al. | G06F 17/30578 715/764 |
| 2004/0243677 A1* | 12/2004 | Curbow et al. | 709/206 |
| 2008/0167937 A1* | 7/2008 | Coughlin et al. | 705/9 |
| 2009/0165022 A1* | 6/2009 | Madsen et al. | 719/318 |
| 2011/0145823 A1* | 6/2011 | Rowe et al. | 718/100 |
| 2011/0314115 A1* | 12/2011 | Nagaraj | 709/206 |

* cited by examiner

*Primary Examiner* — Usmaan Saeed
*Assistant Examiner* — Yu Zhao
(74) *Attorney, Agent, or Firm* — Patent Law Works LLP

(57) ABSTRACT

A system and method for managing all aspects of life using an organizing application is described. The organizing application includes an email engine, a parser and categorizer, a calendar module, an appointment manager, a synchronization engine and a graphical user interface engine. The email engine receives and manages emails. The parser and categorizer receives emails from the email engine or information from another source including a social server. The parser and categorizer identifies a purpose for the information and categorizes the information. The calendar module generates calendar items for pre-existing appointments. The appointment manager makes appointments for users either automatically or after receiving user authorization. The graphical user interface engine generates a user interface for registering with the organizing application and viewing emails, calendar items, alerts and other gadgets.

20 Claims, 12 Drawing Sheets

INBOX FOR TASK MANAGEMENT

The specification relates to an organizing application. In particular, the specification relates to an organizing application that organizes notifications from heterogeneous data sources, automatically makes appointments and generates at least one calendar for the user.

BACKGROUND

Email users suffer from having access to too much information. When a user purchases a product online, the company frequently automatically signs the user up for receiving notifications of sales and new products. Service providers will send monthly emails with summaries of news and helpful tips for maintaining a car, health information, a house, etc. If a user's email address is ever revealed on a website, it can result in the user receiving spam.

One solution to being overwhelmed with emails is to create filters. The user identifies email addresses and request that emails from that address be blocked or relegated to an email folder that the user can avoid ever opening. This will not work if a subset of the emails from a sender are actually important and need to be read. For example, a student loan company sends both advertisements for products and information about the loans. The user can also make a more sophisticated filter that combines an email address with keywords so that all emails that end in "clothing.com" and contain the words "new" or "sale" are filtered while emails about recent orders remain in the inbox. This reduces the number of junk emails but does not solve the problem altogether because emails often get miscategorized. This approach is too blunt a tool to work effectively.

What is needed is a way to better organize emails.

SUMMARY OF THE INVENTION

In some examples, the specification describes at least a system and method for organizing notifications from heterogeneous data sources and automatically making reservations for the user that are displayed on a calendar. In one embodiment, the specification includes a method comprising receiving information from heterogeneous data sources, parsing the information to identify a purpose of the information and a keyword corresponding to at least one category, categorizing the information based at least in part on the purpose and the keyword, determining whether the information relates to a pre-existing appointment, response to an absence of the pre-existing appointment, determining what kind of new appointment to make and making the appointment.

In some embodiments, an organizing application includes a parser and categorizer, an appointment manager, a calendar module and a graphical user interface engine. The parser and categorizer receives information from a social server or the email engine, and parses the information to identify a purpose of the information and a keyword corresponding to at least one category. In one example, a user defined the categories. The parser and categorizer categorizes information according to an area of life including health, family, work, property, pets and a name of each family member. In some embodiments, the parser and categorizer receives information about the relationship between the user and other people included in an email from a social server. In another embodiment, the parser and categorizer generates a task list based on an email.

In some embodiments, the appointment manager automatically makes appointments and reservations for the user in response to specific events. The specific events are defined using the graphical user interface and include triggering events as well as a relationship between the user and other people as defined by the social server. For example, the appointment manager makes the new appointment if the user is related to other people included in the information. In another embodiment, the appointment manager requests permission from the user to make the appointment. The rules regarding appointments are established at the time of registration and can be modified after registration. The appointment manager transmits the appointment information to the calendar module. In one example, the appointment manager generates an alert.

The calendar module populates the calendar with appointments made by the appointment manager and appointments in emails that were identified by the parser and categorizer. The calendar items, task lists and information for generating gadgets are transmitted to the graphical user interface engine. The graphical user interface engine generates a user interface for the user for establishing rules for categorizing the emails, rules for making appointments and rules for whether the appointment can be automatically made or whether the user's permission is required.

In some embodiments the specification includes a computer program product comprising a computer useable medium including a computer readable program, wherein the computer readable program when executed on a computer causes the computer to receive information; parse the information to identify a purpose of the information and a keyword corresponding to at least one category; categorize the information based on the purpose and the keyword; determine whether the information relates to an appointment; responsive to the information not relating to an appointment determine what kind of appointment to make and make an appointment.

In some embodiments, the specification includes a method for organizing an inbox for life, a method for generating calendar items, a method for making appointments, and a method for generating gadgets.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

System Overview

Figure 1:
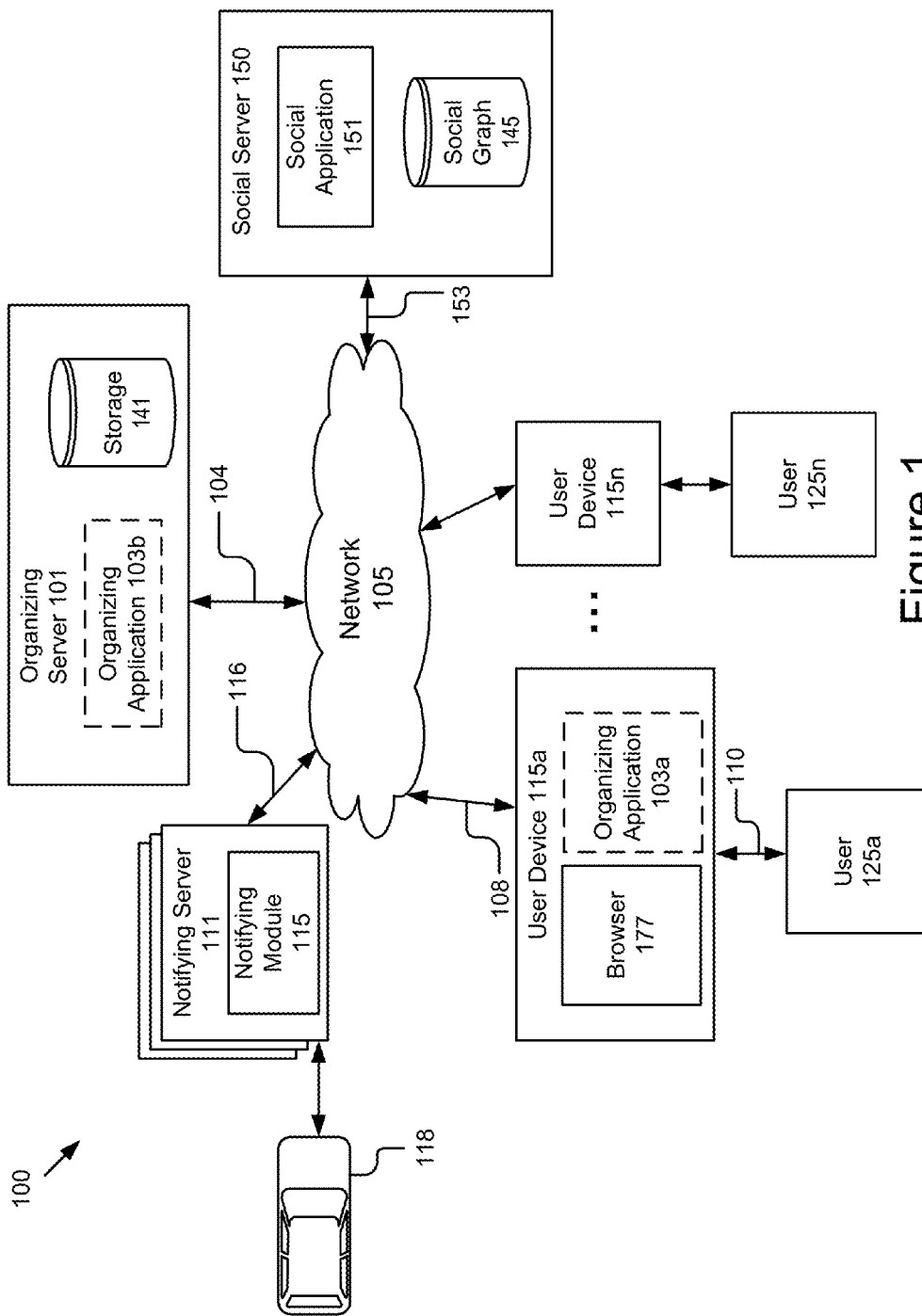
FIG. 1 is a high-level block diagram illustrating an example of a functional view of a system for managing emails.

FIG. 1 illustrates a block diagram of a system 100 for managing data from heterogeneous data sources according to some embodiments. The illustrated description of a system 100 for managing heterogeneous data sources includes user devices 115a . . . 115n that are accessed by users 125a . . . 125n, a notifying server 111, a social server 150 and an organizing server 101. In the illustrated embodiment, these entities are communicatively coupled via a network 105.

The user devices 115a . . . 115n in FIG. 1 are used by way of example. While FIG. 1 illustrates two devices, the description applies to any system architecture having one or more user devices. Furthermore, while only one network 105 is coupled to the user devices 115a . . . 115n, the notifying server 111, the social server 150 and the organizing server 101, in practice any number of networks 105 can be connected to the entities.

Figure 2A:
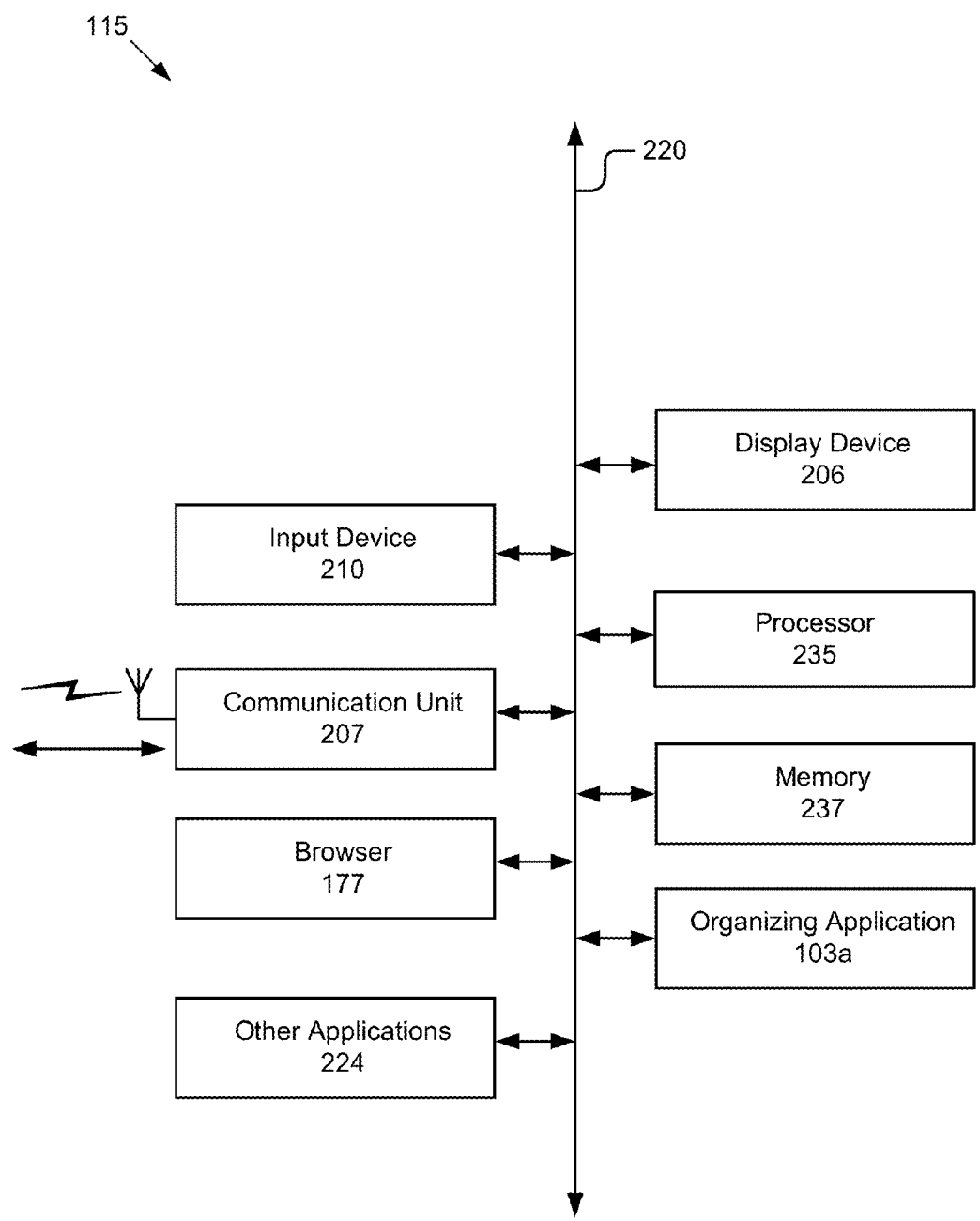
FIG. 2A is a block diagram illustrating an example of a user device.

The user device 115a . . . 115n is any computing device that includes a memory 237 and a processor 235 (see FIG. 2A). For example, the user device 115a . . . 115n may be a personal computer, a laptop, a tablet or a mobile device including a cellular phone, a personal digital assistant or a smart phone. In some embodiments, the user device 115a includes a browser 177 and an organizing application 103a. The browser 177 loads webpages hosted by a web server for example the organizing server 101, which transmits information generated by the organizing application 103b. In another embodiment, the organizing application 103a on the user device 115a generates information for the user. The organizing application 103a receives social information from the social server 150 and emails from the network 105 via signal line 108.

The organizing application 103a organizes information received from heterogeneous data sources, automatically makes appointments and generates a calendar that is populated with the appointments. If the information includes an event that has already been scheduled, the organizing application 103a generates a calendar item that is displayed on a user interface. The user 125a accesses the user device 115a via signal line 110.

The organizing server 101 is a hardware server device. For example, the organizing server 101 is a hardware server operated by Google® of Mountain View, Calif. The organizing server 101 includes storage 141 and, in some embodiments, an organizing application 103b. In some embodiments, the user 125a accesses the organizing application 103b using the browser 117 stored on the user device 115a. Regardless of whether the organizing application 103 is stored on the user device 115a or the organizing server 101, the user data for the organizing application 103 including rules, email, calendar items and appointments is stored in storage 141 on the organizing server 101 that is accessed via signal line 104. Furthermore, while only one organizing server is shown, the system 100 could include one or more email systems.

The organizing application 103 receives emails and other information from a variety of heterogeneous data sources including doctors, veterinarians, car dealerships, schools, the social server 150, etc. In some embodiments, a notifying server 111 includes a notifying module 115 for transmitting notifications to the organizing application 103 via signal line 116. In some embodiments, the notifying module 115 receives notifications from a car 118. In another embodiment, the notifying module 115 communicates with hardware in the house, for example a home security system, a thermostat and a humidistat and emails the organizing application 103 with updates. While FIG. 1 illustrates a notifying server 111 coupled to a car 118, persons of ordinary skill in the art will recognize that this could apply to any other heterogeneous data source that provides notifications including a car, a doctor's office, a library, etc.

The organizing application 103 also receives information from a social server 150. In some embodiments, the social server 150 includes a social application 151 and a social graph 145. The social application 151 generates any social structure where the users are connected by a common feature, for example, Orkut. The common feature includes friendship, family, work, an interest, etc. The information about the users including the relationships between them are stored as part of the social graph 145. The social server 150 transmits the social information over the network 105 via signal line 153.

The network 105 is a conventional type, wired or wireless, and may have any number of configurations for example a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data for example via short messaging service (SMS), multimedia messaging service (MMS), hypertext transfer protocol (HTTP), direct data connection, WAP, email, etc.

Computing Device 115

Referring now to FIG. 2A, the user device 115 is shown in more detail. FIG. 2A is a block diagram of a user device 115 that includes the organizing application 103a, a display device 206, an input device 210, a processor 235, a communication unit 207, a memory 237, a browser 177, and other applications 224.

The display device 206 is hardware for displaying information generated by the user device 115. For example, the display device 206 is a digitizing tablet or graphics pad for a mobile device, a monitor for a desktop computer or an LCD screen for a laptop. In some embodiments, the display device 206 is capable of accepting information from a stylus, a finger or another implement. In another embodiment, the display device 206 merely displays information and the input device 210 accepts all the input. The display device 206 is coupled to the processor 235 and the memory 237.

The input device 210 is a hardware device that accepts input including a mouse, a touch screen and/or a keyboard. The input device 210 is coupled to the processor 235 and the memory 237.

The communication unit 207 is coupled to an antenna and the bus 220. In one example, the communication unit 207 provides a port for direct physical connection to the network 105. In another example, the communication unit 207 includes a transceiver for sending and receiving compound documents. In some embodiments, the communication unit 207 includes a Wi-Fi transceiver for wireless communication with an access point. In another embodiment, the communication unit 207 includes a Bluetooth® transceiver for wireless communication with other devices. In yet another embodiment, the communication unit 207 includes a cellular communications transceiver for sending and receiving data over a cellular communications network for example via short messaging service (SMS), multimedia messaging service (MMS), hypertext transfer protocol (HTTP), direct data connection, WAP, email, etc. In still another embodiment, the communication unit 207 includes ports for wired connectivity including but not limited to USB, SD, or CAT-5, etc. The communication unit 207 links the processor 235 to the network 105 that may include multiple processing systems. The network of processing systems may comprise a local area network (LAN), a wide area network (WAN) (e.g., the Internet), and/or any other interconnected data path across which multiple devices may communicate. The communication unit 207 also provides other conventional connections to the network 105 for distribution of files (media objects) using standard network protocols for example TCP/IP, HTTP, SSH, git HTTPS and SMTP as will be understood by those skilled in the art.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media for example a hard disk drive, a floppy disk drive, a CD-ROM device, a DVD-ROM device, a DVD-RAM device, a DVD-RW device, a flash memory device, or some other mass storage device known in the art for storing information on a more permanent basis.

The organizing application 103*a* is software including routines for parsing emails, organizing information, making appointments and generating a calendar with appointments identified in the parsed emails and from appointments made by the organizing application 103*a*. In some embodiments, the organizing application 103*a* is instructions executable by the processor 235 to provide the functionality described below with reference to FIGS. 5-7. In some embodiments, the organizing application 103*a* is stored in the memory 237 and is accessible and executable by the processor 235. In any event, the organizing application 103*a* is adapted for cooperation and communication with the processor 235, the memory 237, the communication unit 207, the display device 206 and other components of the user device 115.

The browser 177 is software including routines for displaying webpages on the display device 206 and for receiving user input via the input device 210. In another example, the browser 177 includes a plug-in that includes the organizing application 103. In another embodiment, the browser 177 generates display data from the organizing application 103*b* that is stored on the organizing server 101.

The other applications 224 include other software and routines executable by the processor 235 for various other types of functionality. In some embodiments, one or more application programs are executed by the processor 235 including, without limitation, social applications, electronic mail applications, financial applications and calendar applications.

Organizing Server 101

Figure 2B:
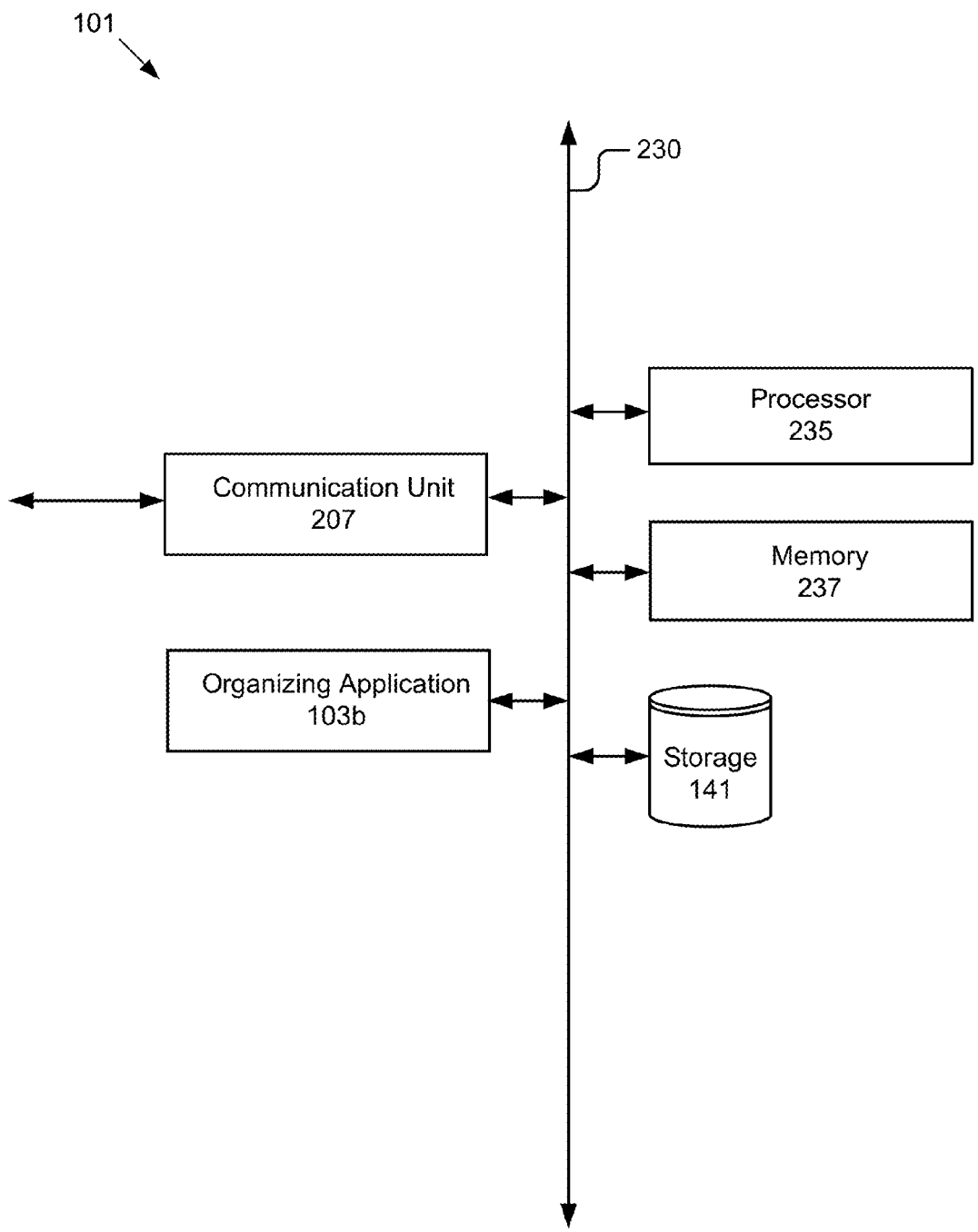
FIG. 2B is a block diagram illustrating an example of an organizing server.

Referring now to FIG. 2B, the organizing server 101 is shown in more detail. FIG. 2B is a block diagram of an organizing server 101 that includes an organizing application 103*b*, a processor 235, a memory 237, and a communication unit 207. Those skilled in the art will recognize that some of the components of the organizing server 101 have the same or similar functionality to the components of the user device 115 so descriptions of these components will not be repeated here. For example, the processor 235, the memory 237 and the communication unit 207 have similar functionality.

Some differences between the components of the organizing server 101 and the user device 115 are noted below. For example, the communication unit 207 may couple the organizing server 101 to the network 105 in a wired manner instead of wirelessly. The processor 235 in the organizing server 101 is more computationally powerful than the processor 235 in the user device 115. The memory 237 includes storage 141 for storing user profiles, emails, instructions for making appointments, etc.

The organizing application 103*b* receives a request from the browser 177 stored on the user device 115. The organizing application 103*b* retrieves the information from storage 141, performs the requested actions and transmits the requested information to the browser.

Organizing Application 103

Figure 3:
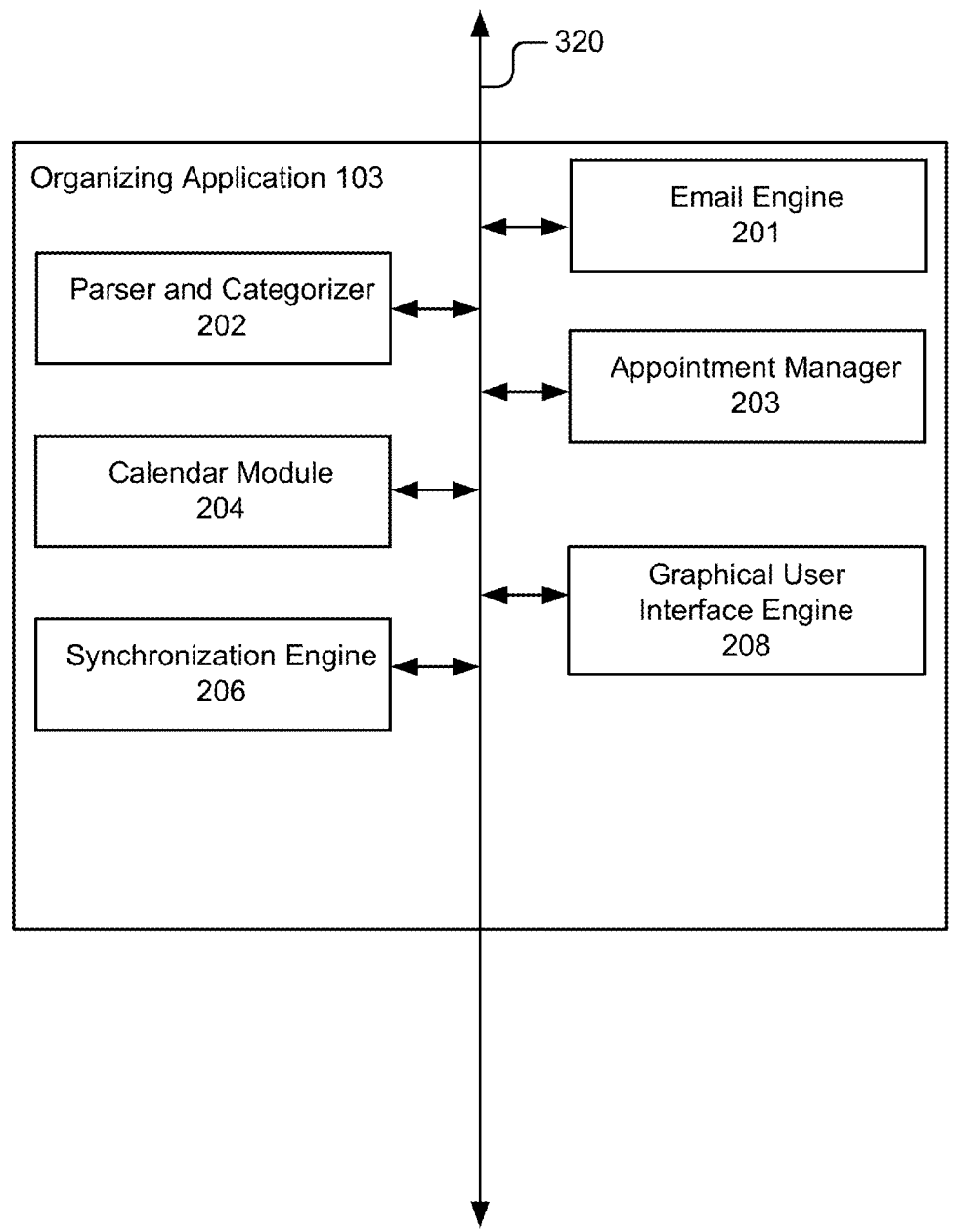
FIG. 3 is a block diagram illustrating an example of an organizing application.

Turning now to FIG. 3, some embodiments of an organizing application 103 are illustrated. The organizing application 103 includes: an email engine 201, a parser and categorizer 202, an appointment manager 203, a calendar module 204, a synchronization engine 206, and a graphical user interface engine 208.

The email engine 201 is software including routines for receiving emails, maintaining a directory of emails and generating emails from the user. Mail servers commonly use either a post office protocol (POP) or internet message access protocol (IMAP) to talk to mail clients and the email engine 201 is configured to use either. In some embodiments, the email engine 201 is a set of instructions executable by the processor 235 to provide the functionality for receiving and managing emails. In another embodiment, the email application 201 is stored in the memory 237 of the user device 115 and is accessible and executable by the processor 235. In either embodiment, the email application 201 is coupled by the bus 320 to the communication unit 207, the processor 235, the memory 237 and other components of the user device 115, or the organizing server 101 via the bus 230.

The parser and categorizer 202 is software including routines for receiving emails from the email engine 201, social information from the social server 150 and other information, for example text messages, instant messages, browsing history, search queries, etc. The social information includes posts, messages sent within the social application 151, chat logs and information from the social graph 145. The parser and categorizer 202 parses the received information to identify the subject matter and parses the social information to identify the relationship between the user and the other people related to an email or social information. In some embodiments, the parser and categorizer 202 categorizes the emails and social information according to different areas of life. In some embodiments, the parser and categorizer 202 categorizes received information as applying to work, health, family and property. In another example, the parser and categorizer 202 categorizes received information according to the names of different family members, for example a spouse and children. Persons of ordinary skill in the art will recognize that other categories are possible. In some embodiments, the parser and categorizer 202 is a set of instructions executable by the processor 235 to provide the functionality described below for parsing and categorizing emails. In another embodiment, the parser and categorizer 202 is stored in the memory 237 of the user device 115 and is accessible and executable by the processor 235. In either embodiment, the parser and categorizer 202 is adapted for cooperation and communication with the processor 235, the memory 237 and other components of the user device 115 via the bus 320 or the organizing server 101 via the bus 230.

The parser and categorizer 202 receives emails from the email engine 201. The emails are from devices within the user's home, work emails, emails from doctors, emails from schools, voice messages translated into emails, etc. In some embodiments, the parser and categorizer 202 also receives messages including text messages (e.g. SMS) and instant messages. The parser and categorizer 202 scans the emails and any messages for information used to identify the purpose of the email. For example, the parser and categorizer 202 identifies the purpose of an email as relating to an appointment when the email includes words, for example, "appointment," "schedule," or "timing," and identifies these emails as appointment emails. In another example, the parser and categorizer 202 identifies words relating to a task list, for example, "prepare," "file," "bring," and "required" to identify items for a task list. In yet another example, the parser and categorizer 202 identifies words relating to matters handled by the appointment manager, for example, "too low," "warning," "alert," or "unauthorized." Persons of ordinary skill in the art will recognize that one email can include multiple purposes.

Next, the parser and categorizer 202 identifies words in the emails that are used to categorize the emails. Using the suggested categories above, the parser and categorizer 202 identifies an email as being in the work category if it uses words like "business," "conference," and words that the user added through a user interface with keywords that pertain to the user's business, for example, "lawsuit" or "IPO" in an example where the user is a lawyer or works in business. For the health category, the parser and categorizer 202 identifies words, for example, "doctor," "checkup," "workout," and "prescription" as being associated with the health category. The parser and categorizer 202 identifies words, for example, "groceries," "travel fares," "soccer practice," etc. as being associated with the family category. In some embodiments, the user adds the name of the user's spouse, children and relatives as names associated with the family category. The parser and categorizer 202 identifies words, for example, "mortgage," "car" and "security" with the property category.

In addition, if the email engine 201 includes different email addresses, those email addresses can be associated with different categories, for example, an email address for a work account and an email address for personal matters. The categorizer automatically categorizes emails from a work account as work emails.

In some embodiments, the parser and categorizer 202 uses the information parsed and extracted from emails to generate the task list. For example, if an email to the user about the first day of school for the user's children includes a reminder that the user should bring proof of vaccinations to the school, the parser and categorizer 202 automatically generates an item for the task list for finding and bringing the children's vaccination records to school.

The appointment manager 203 is software including routines for receiving parsed and categorized emails from the parser and categorizer 202, for generating appointments for the user and for generating an alert gadget that is displayed by the GUI engine 208. In some embodiments, the appointment manager 203 is a set of instructions executable by the processor 235 to provide the functionality described below for generating appointments and transmitting the appointment information to the calendar module 204 for display on the calendar.

For example, the parser and categorizer 202 receives an email from the notification server 111 that the temperature in the house is too low and transmits the information to the appointment manager 203. The appointment manager 203 obtains an appointment with a heater repairman, for example, by generating an email that is transmitted by the email engine 201 to the heater repair company requesting an appointment for the next available slot or specifying a time for the appointment. In another embodiment, the appointment manager 203 fills out a form to make a reservation, for example, from a website that specializes in making appointments. The appointment manager 203 generates an alert that is displayed on the user interface notifying the user that the temperature in the house is too low and that the appointment manager 203 made an appointment.

In some embodiments, the user answers a series of questions at registration that are used to generate instructions for the appointment manager 203. For example, the questions include how much the temperature in the house has to fall before the appointment manager 203 makes an appointment for a heater repairman, whether the appointment manager 203 should automatically make doctor's appointments for the user's children according to the date of their last visit, etc. In some embodiments, the questions include a checklist of different objects with recurring tasks that the user selects to create recurring appointments. For example, the checklist includes a coffeemaker and a recurring appointment for cleaning the coffee maker. By prompting the user to select different items the user does not have to remember all the relevant objects that need servicing. In another embodiment, the appointment manager 203 is stored in the memory 237 and is accessible and executable by the processor 235. In either embodiment, the appointment manager 203 is adapted for cooperation and communication with the processor 235, the memory 237 and other components of the user device 115 via the bus 320 or the organizing server 101 via the bus 230.

The calendar module 204 is software including routines for receiving parsed and categorized emails from the parser and categorizer 202, receiving appointments from the appointment manager 203 and generating calendar entries from the received information. In some embodiments, the calendar module 204 is a set of instructions executable by the processor 235 to provide the functionality described below for generating calendar entries. In another embodiment, the calendar module 204 is stored in the memory 237 of the user device 115 and is accessible and executable by the processor 235. In either embodiment, the calendar module 204 is adapted for cooperation and communication with the processor 235, the memory 237 and other components of the user device 115 via the bus 320 or the organizing server 101 via the bus 230.

In some embodiments, the calendar module 204 maintains a separate calendar for each category and one calendar with all the entries. This helps the user organize different aspects of life. For example, the appointments relating to the health category are displayed in a single calendar so that the user can manage doctor's appointments, reminders to workout and reminders to pick up a prescription without having to also think about when the mortgage is due. The calendar module 204 transmits the calendar information to the GUI engine 208 to incorporate into a user interface. In some embodiments, the calendar module 204 also transmits a summary of the calendar items to the GUI engine 208 for display.

The synchronization engine 206 is software including routines for receiving calendar entries from the calendar module 204 and synchronizing the calendar entries with other calendar programs to which the user subscribes. In some embodiments, the synchronization engine 206 is a set of instructions executable by the processor 235 to provide the functionality for interacting with other modules on the user device 115 and synchronizing calendar entries with those devices. In the case of calendar programs that store information in the cloud, the synchronization engine 206 pushes updates to those calendar programs using the communication unit 207 via the network 105. In another embodiment, the synchronization engine 206 is stored in the memory 237 of the user device 115 and is accessible and executable by the processor 235. In either embodiment, the synchronization engine 206 is adapted for cooperation and communication with the processor 235, the memory 237, the communication unit 207, and other components of the user device 115 via the bus 320 or the organizing server 101 via the bus 230.

The graphical user interface (GUI) engine 208 is software including routines for generating a user interface. The GUI engine 208 is a set of instructions executable by the processor 235 to provide the functionality for registering a user, adding keywords to different categories, adding email addresses for the parser and categorizer 202 to parse and categorize, adding preferences for either automatically making calendar items or appointments for the user or requesting that the user approve the calendar items or appointments, generating organized summaries of the emails, and generating calendars with appointments.

In some embodiments, GUI engine 208 generates a user interface for organizing data including summaries of emails and gadgets for displaying information. Gadgets are self-contained pieces of code that are displayed on a webpage. In one example, gadgets are plug-ins that are hosted by the organizing server 101. In another embodiment, the GUI engine 208 is stored in the memory 237 and is accessible and executable by the processor 235. In either embodiment, the GUI engine 208 is adapted for cooperation and communication with the processor 235, the memory 237 and other components of the user device 115 via the bus 320 or the organizing server 101 via the bus 230.

Examples of Organizers

Figure 4A:
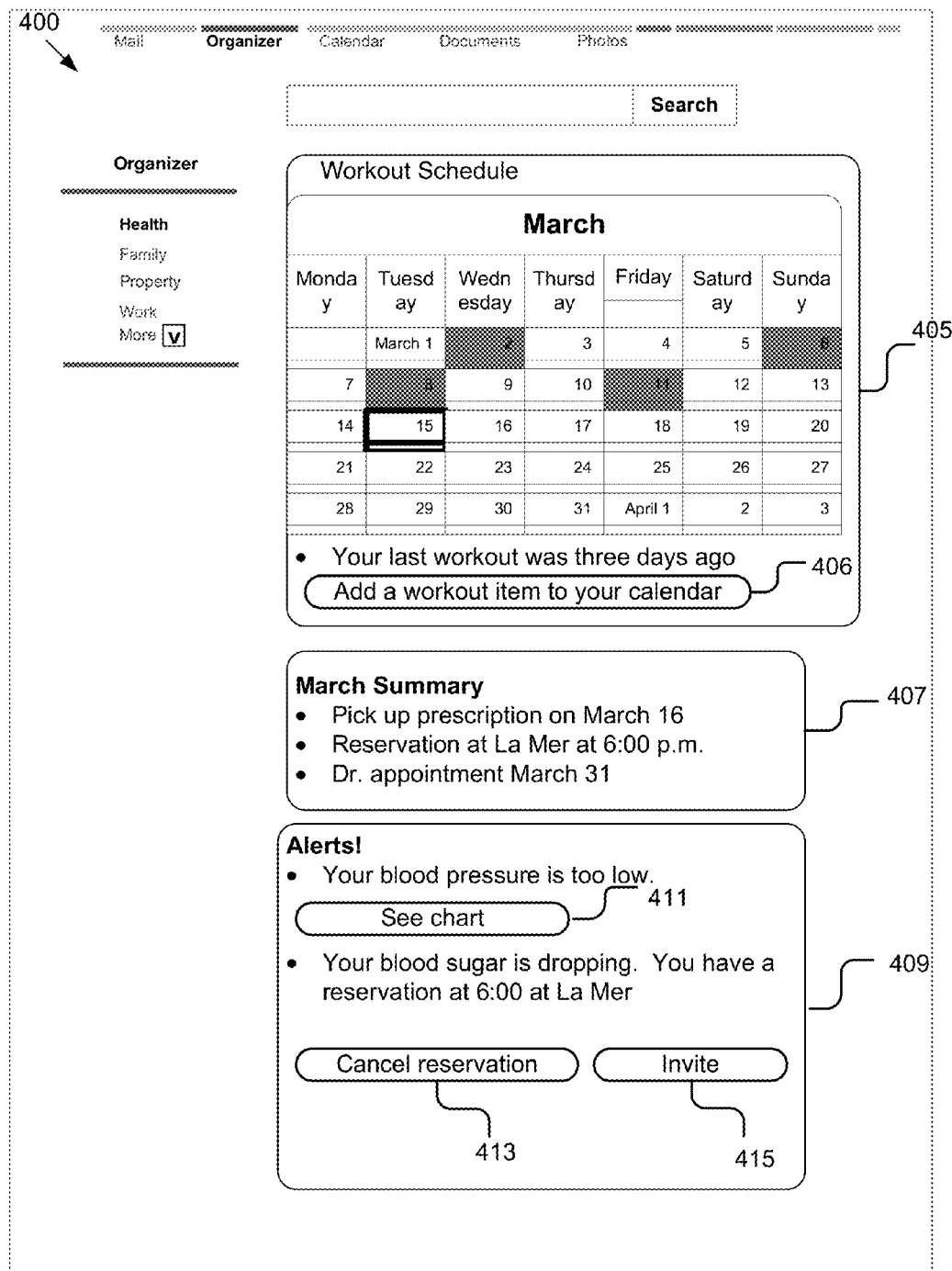
FIG. 4A is a graphic representation of an example user interface for an organizer that displays health information.

FIG. 4A is a graphic representation 400 of an organizer that displays health information according to some embodiments. In this example, the categories are divided into health, family, property and work. The organizer displays different gadgets associated with health information. For example, in this example there is a workout schedule calendar 405 displayed with the dates of the workout shaded in grey. The parser and categorizer 202 receives notifications that the user performed workouts based on information recorded from a device attached to the user's sneaker, which transmits the data to the email engine 201. In response to selecting one of the days when the user performed a workout, the GUI engine 208 generates a display with the statistics from the workout, for example, length and calories burned. If the workout involved travelling a distance, for example, by running or bicycling while the user was wearing a GPS monitor, selecting the day of the workout triggers the GUI engine 208 to display a map of the workout. The workout schedule calendar 405 also contains a reminder that the user's last workout was three days ago and an icon 406 for adding a workout item to the calendar.

In some embodiments, the GUI engine 208 generates a summary 407 of health events so that the user can anticipate upcoming deadlines. In this example, the user can pick up a prescription, the appointment manager 203 made an appointment for the user at La Mer for 6:00 p.m., and the user has a doctor's appointment on March 31. The GUI engine 208 also generates an alert gadget 409 that includes notifications of interest to the user. In this example, the user employs a blood pressure monitor that transmits emails to the organizing application 103. Based on the information in the emails, the GUI engine 208 notifies the user that the user's blood pressure is too low. If the user selects the "see chart" icon 411, the GUI engine 208 generates a display that includes all the blood pressure information including daily readings and graphs of the readings as a function of time.

In addition to a blood pressure monitor, the user employs a blood sugar monitor. When the user's blood pressure drops below a certain amount, the appointment manager 203 automatically makes a reservation for the user at the user's favorite restaurant. The alert gadget 409 includes a "cancel reservation" icon 413 for cancelling the reservation and an "invite" icon 415 for inviting friends to join the user at the restaurant.

Figure 4B:
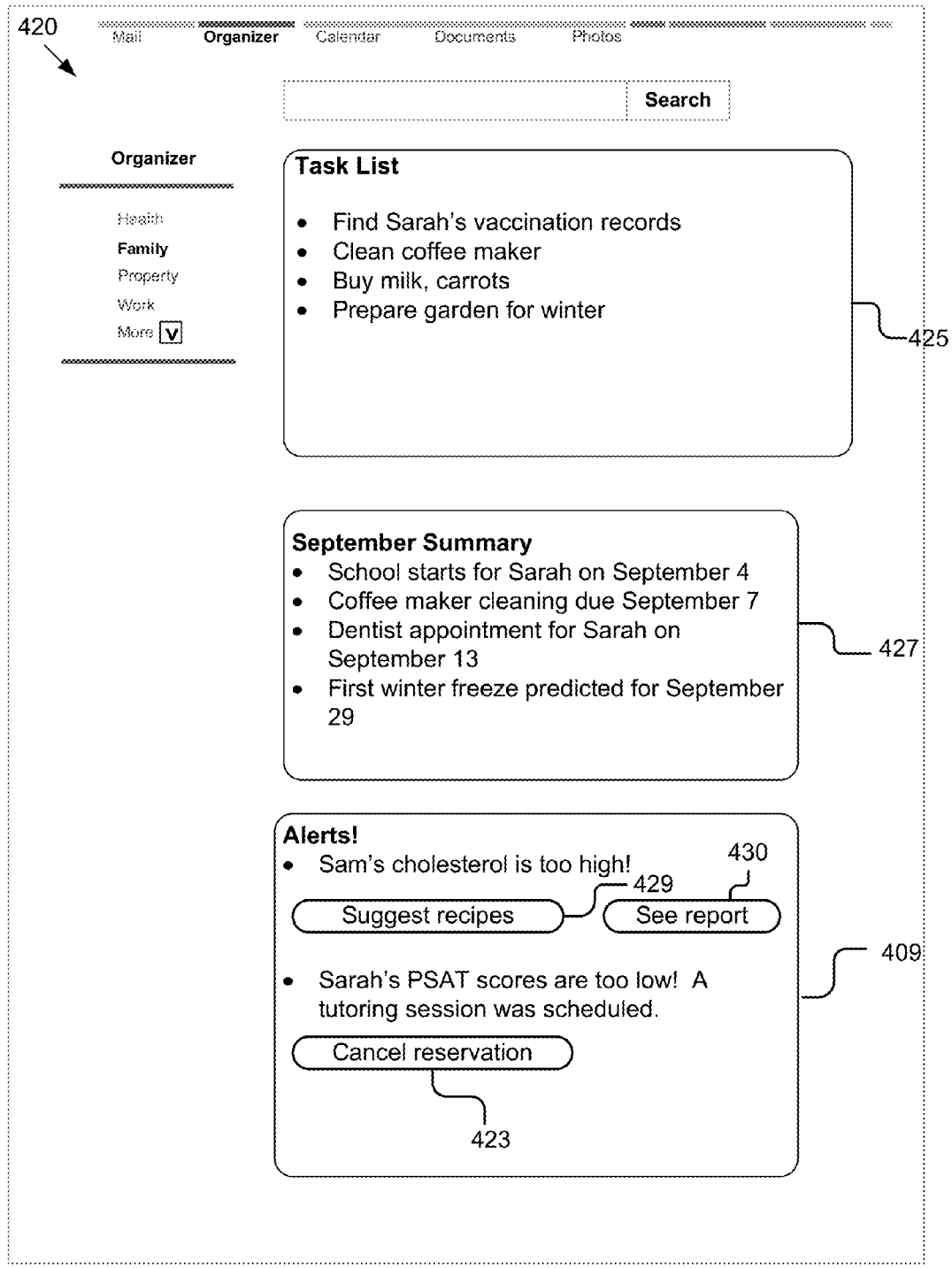
FIG. 4B is a graphic representation of an example user interface for an organizer that displays family information.

FIG. 4B is a graphic representation 420 of an organizer that displays family information according to some embodiments. In this example, family includes things relating to the operation of a household including purchasing groceries, maintaining household items, and items relating to other members of the household including spouses and children. In some embodiments, the organizer for family items includes a task list 425, a September summary 427 and an alerts gadget 409. The task list 425 is automatically generated from emails and calendar entries. For example, the user received an email from her daughter's school that included a reminder that Sarah's vaccination records are due on the first day of school. As a result, the parser and categorizer 202 generated a task item for the user to find Sarah's vaccination records. The task item for cleaning the coffee maker is based on a recurring calendar item to clean the coffee maker every three months. The task item to buy milk and carrots is based on the refrigerator containing a sensor and RFID tags on all the items within the refrigerator. Once the milk and carrots were removed from the refrigerator and not returned, the refrigerator sent an email to the organizing module 103 to buy those items. The parser and categorizer 202 identified the task from the email and the GUI engine 208 included the item on the task list. The task item for preparing the garden for winter was generated from calendar items generated by the calendar module 204 and associated with the calendar item for the first winter freeze being predicted for September 29.

The September summary 427 is a summary of items extracted from emails and calendar items. Each of these items corresponds to an entry on the calendar generated by the calendar module 204. In this example, the September summary 427 displays at item for school starting for Sarah on September 4. This is derived from an email from the school. The coffee maker is due for a cleaning on September 7. This comes from a recurring calendar item that was manually input by the user. The dentist appointment for Sarah for September 13 originated in an email from the dentist's office. The reminder about a first winter freeze comes from an email transmitted by a website dedicated to gardening.

The alerts gadget 409 includes two items: a warning that the user's husband Sam has cholesterol that is too high and an alert that Sarah's PSAT scores are too low and in response to the score, the appointment manager 203 made an appointment with a tutor for Sarah. In the first instance, the alert gadget 409 suggests recipes 429 that would lower Sam's cholesterol. The user can also select the "see report" icon 430 to view all of Sam's test results. For the user's daughter, the user can select the "cancel reservation" icon 423 to cancel the appointment for a tutoring session.

Figure 4C:
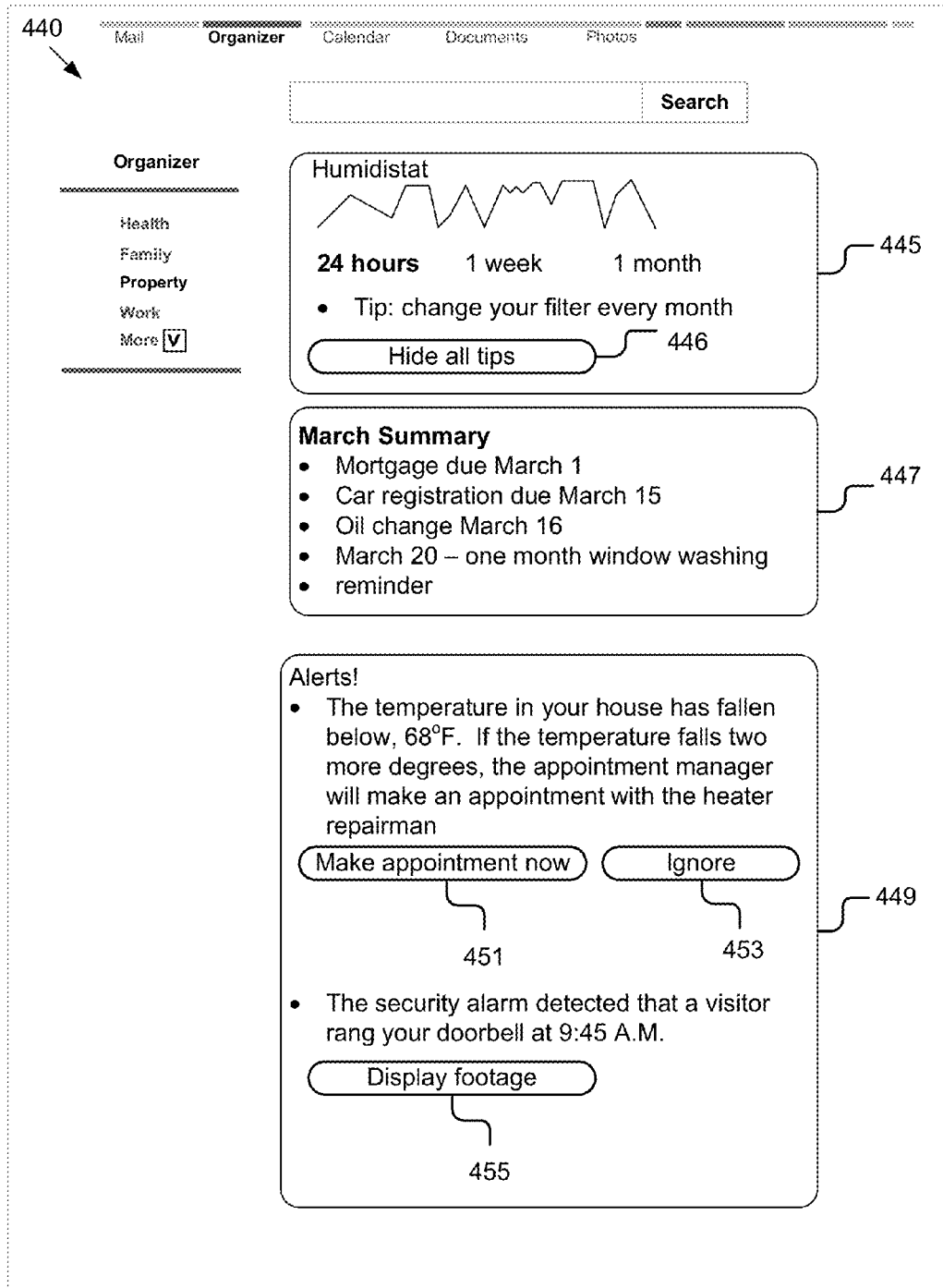
FIG. 4C is a graphic representation of an example user interface for an organizer that displays property.

FIG. 4C is a graphic representation 440 of an organizer that displays information related to properties according to some embodiments. In one example, the property organizer relates to valuable property, for example, a car and a house, and not smaller items, for example, a refrigerator, that are covered by the family organizer. Persons of ordinary skill in the art will recognize that the property organize could encompass all property items regardless of the value.

In this example, the organizer for property includes a humidistat gadget 445, a March summary 407 and an alert gadget 409. The humidistat gadget 445 displays the humidity level in the user's home for the past 24 hours. The user can also select a graph of the humidity levels for the past week or month. The humidistat gadget 445 also includes a helpful daily tip and a "hide all tips" icon 446 that the user can select to further configure the appearance of the humidistat gadget 445.

The March summary 447 includes a reminder that the mortgage is due on March 1, the car registration is due on March 15, the oil change is due on March 16, and March 20, is a one month window washing reminder. The March summary 447 is generated with information extracted by the parser and categorizer 202 from emails and manual information input into the user interface and displayed on a calendar generated by the calendar module 204.

The alerts gadget 449 includes an alert that the temperature in the user's house has fallen below 68° F. and is two degrees away from prompting the alerts gadget 449 to send a message to the appointment manager 203 to schedule an appointment with the heater repairman. The alert is derived from an email message transmitted to the email engine 201 and parsed and categorized by the parser and categorizer 202. The user can select the "make appointment now" icon 451 to schedule the appointment without waiting for the temperature to fall. Alternatively, the user can remove the alert by selecting the "ignore" icon 453.

The alerts gadget 449 also displays an alert that the security alarm detected that a visitor rang the doorbell at 9:45 A.M. This information is obtained from a security camera at the user's home that records footage and transmits emails to the user when any activity occurs. The user can view footage taken when the doorbell was rung by selecting the "display footage" icon 455.

Figure 4D:
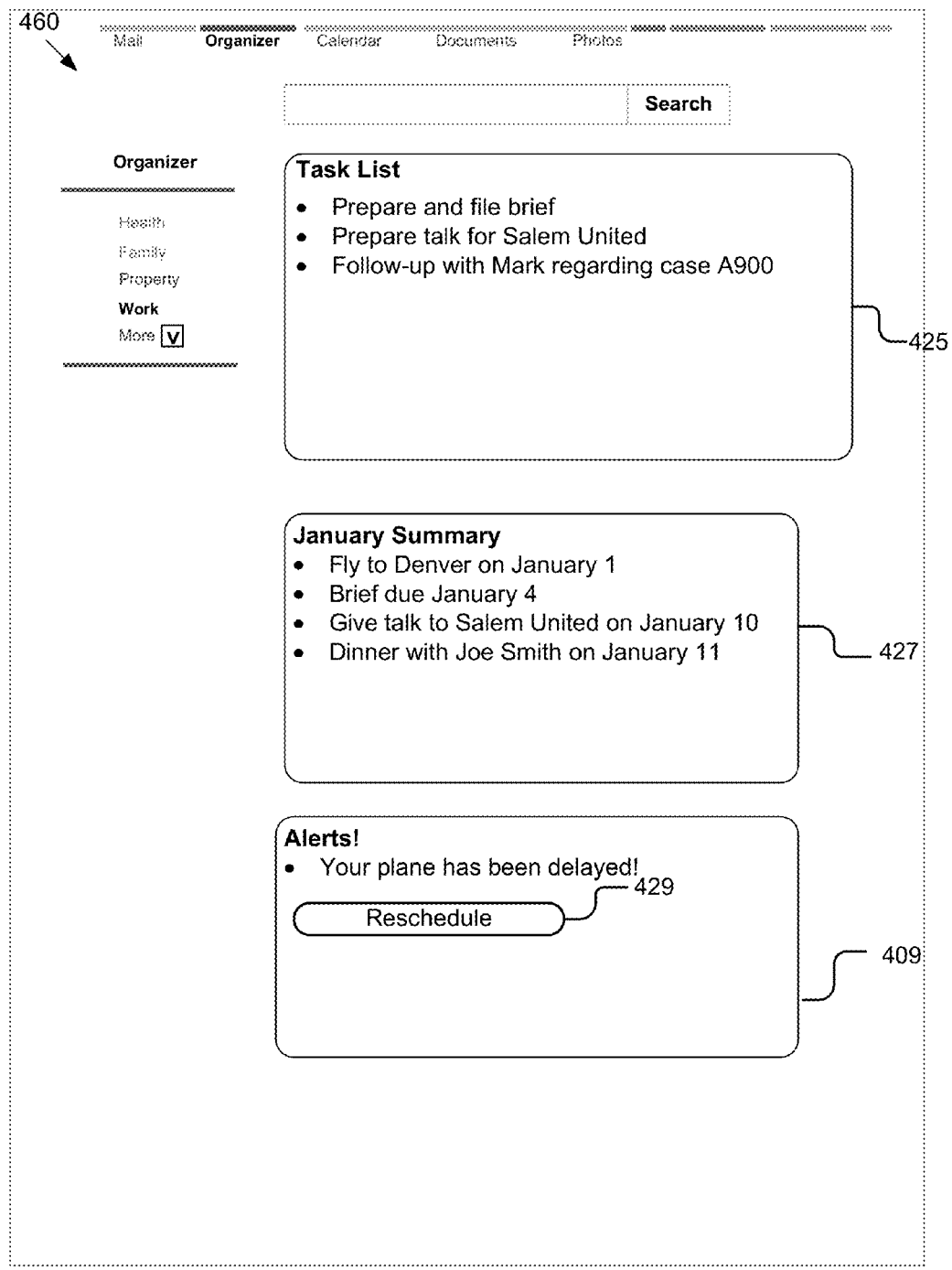
FIG. 4D is a graphic representation of an example user interface for an organizer that displays work.

FIG. 4D is a graphic representation 460 of an organizer that displays work information according to some embodiments. The task list 425 includes items extracted from emails by the parser and categorizer 202 and items generated by the calendar module 204. In this example, the task list includes the following items: prepare and file brief, prepare talk for Salem United and follow-up with Mark regarding case A900.

The January summary 427 is a summary of the January calendar items generated by the calendar module 204. In this example, the January summary 427 includes a January 1 flight to Denver, a brief that is due on January 4, a talk for Salem United on January 10, and dinner with Joe Smith on January 11.

Methods

Figure 5:
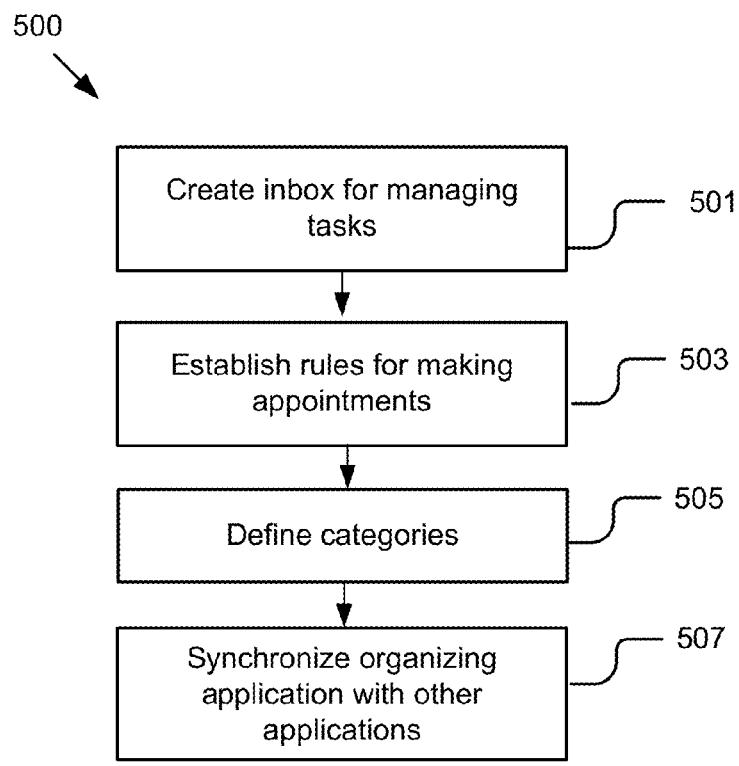
FIG. 5 is a flow diagram that illustrates example steps for registering with an organizing application.
Figure 6A:
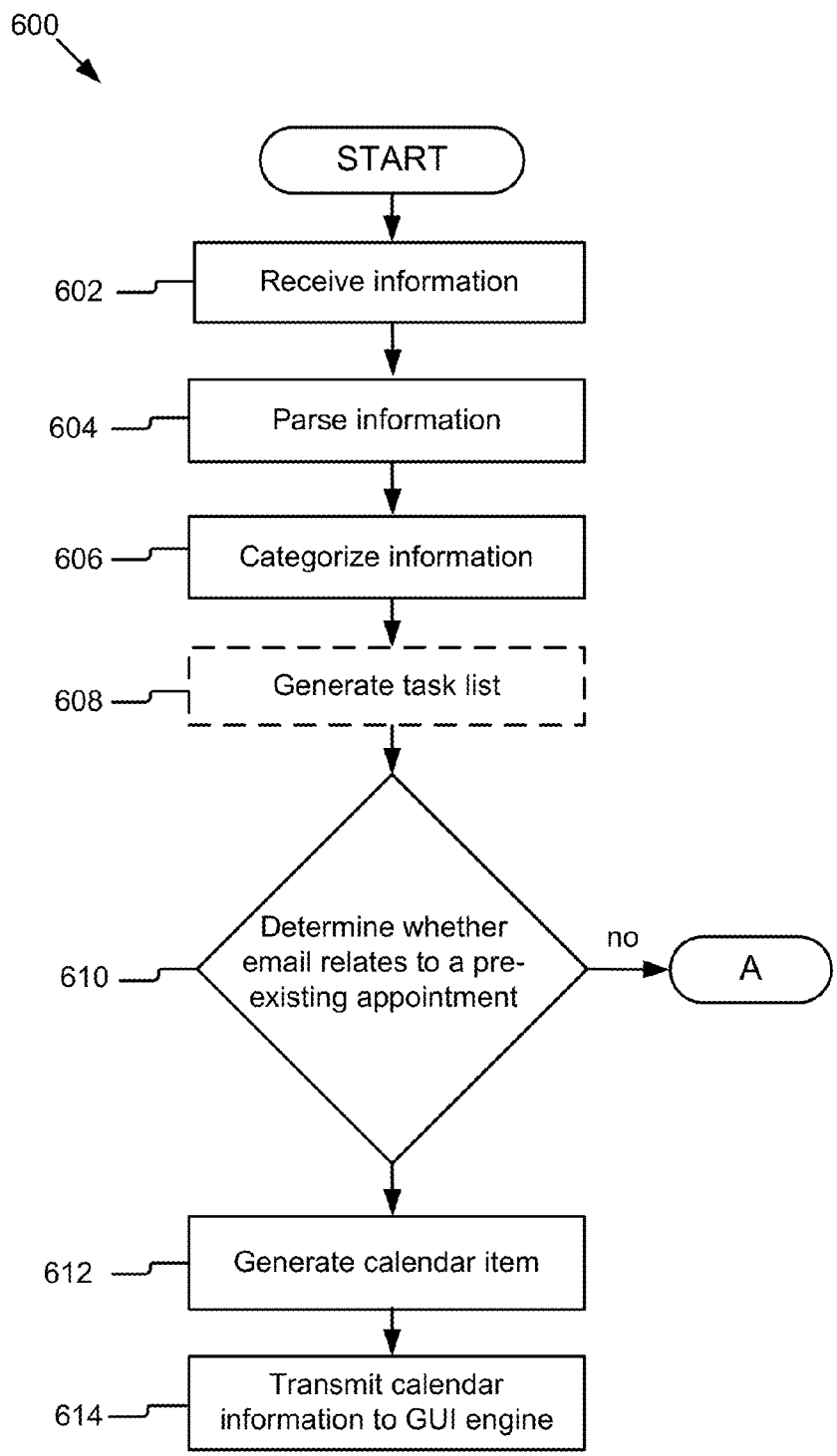
FIGS. 6A and 6B are a flow diagram that illustrate example steps for generating calendar entries and making appointments.
Figure 6B:
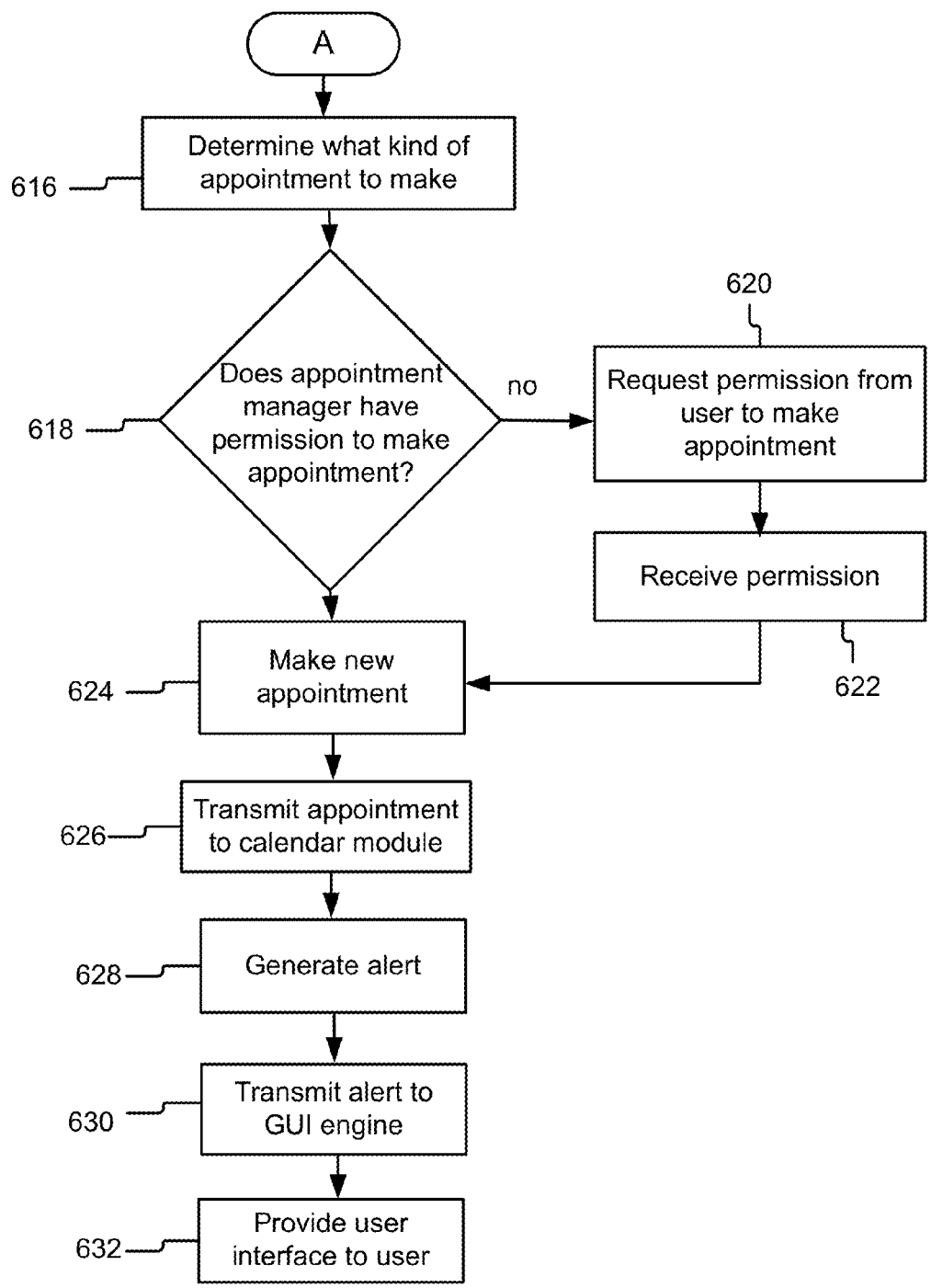
Figure 7:
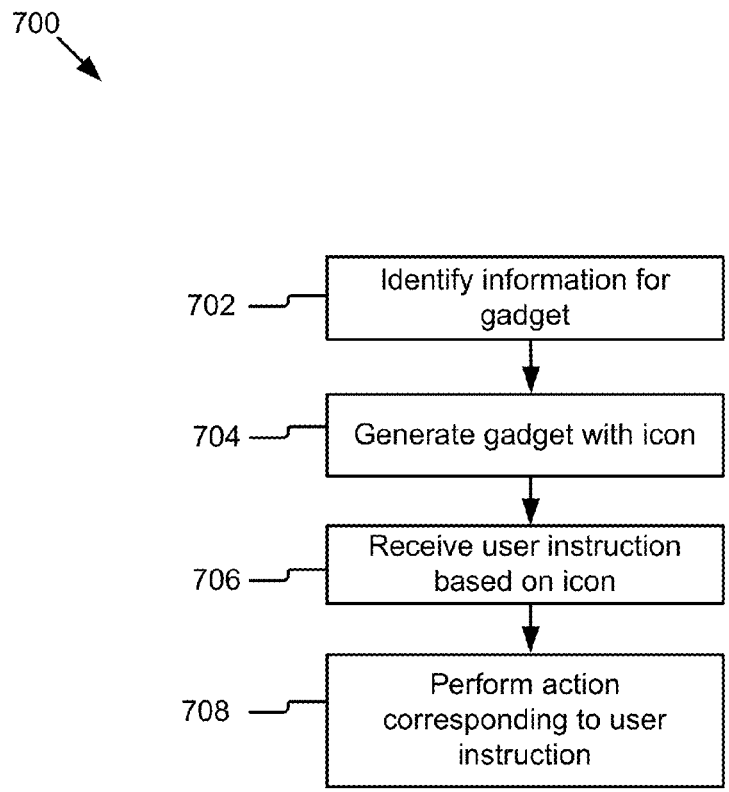
FIG. 7 is a flow diagram that illustrates example steps for generating a gadget and performing actions in response to user requests.

Referring now to FIGS. 5-7 various methods of the specification will be described.

FIG. 5 is a flow chart 500 that illustrates steps for creating an inbox for life for the user by registering a user with the organizing application 103. The GUI engine 208 generates a user interface for creating 501 an inbox for managing tasks. For example, the GUI engine 208 receives identifying information for the user, a preferred username, a password, etc. which are transmitted to the email engine 201. The email engine 201 generates an email address for the user. In another example, the user already has email addresses with third party services and the GUI engine 208 requests login information from the user to receive those emails with the email engine 201 using simple mail transfer protocol (SMTP) or a similar protocol for email retrieval. The email engine 201 creates an email address, sends the email address to a mail server and gets a notifying module installed on the mail server, which then notifies the email engine 201 of new emails.

The GUI engine 208 also generates a user interface for establishing 503 rules for making appointments. First, the GUI engine 208 explicitly asks the user to confirm whether the appointment manager 203 has permission to make appointments on behalf of the user or whether the user prefers to choose when the appointment manager 203 makes the appointment. These rules can be modified after the registration process is complete by selecting permissions options in the user interface.

Next, the GUI engine 208 also displays rules that are specific to the type of appointment. For example, the appointment manager 203 automatically makes an appointment or requests permission from the user to make an appointment in response to the parser and categorizer 202 identifying keywords in an email, for example, "systolic blood pressure is 160 or above," "last doctor's appointment was three months ago," or "the house temperature dropped below 64° F." In another example, the appointment manager 203 automatically makes an appointment or requests permission from the user to make an appointment in response to calendar entries, for example, making an appointment for a dentist's appointment six months from the last calendar entry for a dentist's appointment. In yet another example, the calendar module 204 or appointment manager 203 will only make calendar items or appointments, respectively, if the user has a close enough relationship to the other people referenced in the email as dictated by the social graph received via the social server 150. This prevents the user from having calendar entries and appointments made for events that the user would not want to attend.

The GUI engine 208 generates a user interface for defining 505 categories within the user's life. For example, the default categories are health, family, property, and work. In another embodiment, the default categories are associated with each member of a family. In yet another embodiment, the user definite custom categories and submits keywords that the parser and categorizer 202 uses to categorize emails. For example, the user wants a category for a pet named Rocko. The user interface includes a section for keywords that apply to the pet where the user inputs "Rocko," "dog," "veterinarian," and "heartworm medicine."

The GUI engine 208 displays a user interface for synchronizing 509 the organizing application 103 with other applications, for example, a calendar application stored on the user device 115 or a web application. The options for establishing synchronization include specifying the location of the calendars, establishing updates through push/pull technology, and designating the organizing application 103 or another calendar as dominant in the event that there is a conflict. If the organizing application 103 is stored on the user device 115, the synchronization engine 206 synchronizes with the user device's 115 calendar. If the organizing application 103 is stored on the organizing server 101, the synchronization engine 206 transmits push notifications to the calendar on the user device 115 or any other calendar that the user wants synchronized.

FIGS. 6A-6B are flow diagrams 600 illustrating the steps for generating calendar items and making appointments. In some embodiments, the parser and categorizer 202 receives information from the social server 150, the email engine 201 or a third party. The social server 150 transmits posts, messages or chat logs from the social application 151 and the social graph 145. The email engine 201 transmits emails. Third parties transmit browsing history, search queries, etc. The parser and categorizer 202 parses 604 the information. The parsing includes identifying a purpose of the information and keywords that can be used to categorize the information. The parser and categorizer 202 also identifies a relationship between the user and any other people identified in the information, for example, an email detailing plans for an event. For example, the parser and categorizer 202 identifies the relationship between the user and the person that sent the email and the relationship between the user and any other people mentioned or copied in the email.

The parser and categorizer 202 then categorizes 606 the email according to the purpose, the keyword using the categories that were defined during the registration process and, in some embodiments, the relationship between the user and any other people relevant to the information.

In some embodiments, the parser and categorizer 202 generates 608 a task list from the information. The parser and categorizer 202 identifies words related to tasks, for example, "due," "bring," and "file" and generates a task list based on the words. For example, an email that states that "The PTA meeting is on July 2 and you volunteered to bring an angel food cake," is used to generate a task item for "Make angel food cake for July $2^{nd}$'s PTA meeting." The parser and categorizer 202 transmits the task list to the GUI engine 208 for display.

The parser and categorizer 202 determines 610 whether the information relates to a pre-existing appointment. If no, the parser and categorizer 202 transmits the information to the appointment manager 203 (See FIG. 6B). If yes, the parser and categorizer 202 transmits the information to the calendar module 204.

The calendar module 204 generates 612 a calendar item based on the information. For example, an email from a doctor's office that states "Reminder: your doctor's appointment is on May 15, 2011, at 10:30 a.m." is parsed by the parser and categorizer 202 and transmitted to the calendar module 204, which creates a calendar item for a doctor's appointment at 10:30 a.m. on May 15, 2011. The calendar module 204 transmits 614 the calendar item to the GUI engine 208 for display. In some embodiments, the calendar module 204 also generates a summary of calendar items that is transmitted to the GUI engine 208 for display (See FIG. 7). If the calendar item is missing any information, in some embodiments, the GUI engine 208 generates a calendar item that requests that the user provide the missing information or the user interface allows the user to provide the information without prompting. In yet another embodiment, if the calendar item involves other users, the calendar module 204 transmits the calendar item to the email engine 201, which transmits a notification to the other users that the reservation was made, the event has been scheduled, etc.

In some embodiments, the calendar module 204 determines whether the user wants to attend the event before making a calendar item. For example, the calendar module 204 receives an invitation from a friend of a friend of a friend (third degree) according to the social graph inviting the user to attend a meeting about "an exciting investment opportunity." The user is too attenuated from the inviter to automatically accept the invitation. Thus, either the calendar invitation is first sent to the user for confirmation, the appointment appears on the calendar but tentatively as displayed in grey or italics, or the calendar module 204 does not create a calendar item.

Turning now to FIG. 6B, if the information does not relate to an appointment (i.e. a pre-existing appointment), the information is transmitted to the appointment manager 203. The appointment manager determines 616 what kind of appointment to make. For example, when the information is a notification that the user's blood sugar is too low, the appointment manager 203 determines based on the rules established at registration that the user wants an appointment at a restaurant. The appointment manager 203 also determines whether to make an appointment at all depending upon the relationship between the user and the other people associated with the email. For example, the parser and categorizer 202 categorized an email as being about a birthday party that is being held for a person that is a friend the user. Everyone copied on the email confirmed that they are available on January 11, at 8:30 pm and they would like to meet at the local Croatian restaurant. Because the user is only one degree away from the person with the birthday according to the social graph, the user will want to go to the party. As a result, the appointment manager 203 determines that the user wants an appointment at the location Croatian restaurant for January 11, at 8:30 pm for the number of people copied on the email.

The appointment manager 203 determines 618 whether the appointment manager 203 has permission to make the appointment. This is determined based on whether the user authorized the appointment manager 203 to automatically make appointments or whether the user prefers the appointment manager 203 to request permission from the user before making the appointment. If the appointment manager 203 does not have permission to make the appointment, the appointment manager 203 requests 620 permission from the user to make the appointment. For example, the appointment manager 203 transmits an email or a text message to the user requesting permission.

Once the appointment manager 203 receives 622 permission or if the appointment manager has permission to automatically make an appointment, the appointment manager 203 makes 624 the new appointment. For example, the appointment manager 203 generates an email on behalf of the user requesting that the service provide make an appointment. Alternatively, the appointment manager 203 submits an auto-complete form to a website to make an appointment. The appointment manager 203 transmits 626 the appointment information to the calendar module 204, which generates a calendar item and transmits the calendar item to the GUI engine 208 for display.

For information that is not directly related to making an appointment but still qualifies as something that the user should review, the appointment manager 203 generates 208 an alert for display on the alert gadget. The alert includes both information regarding the alert and options for responding to the alert. For example, the alert is accompanied by an option to make an appointment, view footage of a video from a security camera, reschedule or cancel an appointment, view additional information, etc. The appointment manager 203 transmits 630 the alert to the GUI engine 208 for display. The GUI engine 208 provides 632 the user interface to the user. The user interface displays appointments, summaries, alerts and tasks.

FIG. 7 illustrates the steps for generating a gadget and performing actions in response to user input according to some embodiments. The gadgets are generated by the parser and categorizer 202, calendar module 204, or the appointment manager 203, depending upon the type of gadget. The process begins with identifying 702 information for a gadget. For example, the categorizer and parser 202 extracts tasks from emails received by the email engine 201 and other information received directly by the categorizer and parser 202, for example social information and text messages. The calendar module 204 identifies calendar items from emails or appointments made by the appointment manager 203 for the calendar summary gadget, which displays summaries of calendar items. The appointment manager 203 identifies items for the alert gadget by comparing the parsed information with rules established by the user. For example, in FIG. 4B the alert gadget 409 displays an alert that Sam's cholesterol is too high. This is in response to a rule established by the user that the user should be notified when Sam's cholesterol exceeds 200 mg/dL.

Once the information is identified, the categorizer 202, calendar module 204, or the appointment manager 203 generates 704 a gadget icon. The GUI engine 208 displays the gadget with an icon. The icon includes options for the user to select to notify the organizing application 103 to perform an action. For example, if the alert gadget displays a notification that the appointment manager 203 made a reservation at a restaurant, the GUI engine 208 displays an icon for canceling the reservation. In another example, the GUI engine 208 displays the user's workout schedule with an icon for adding a workout item to the calendar. In yet another example, the GUI engine 208 displays a warning that Sam's cholesterol is too high with an icon for suggesting recipes.

The GUI engine 208 receives 706 user instruction based on the icon. Specifically, the user selects the icon and the GUI engine 208 identifies the action associated with the icon. The categorizer 202, calendar module 204, or the appointment manager 203 performs 708 the action corresponding to the user instruction. For example, the user selects the icon for the alert gadget to suggest recipes. The appointment manager 203 retrieves recipes that are transmitted to the user, for example, via the email engine 201.

In the above description, for purposes of explanation, numerous specific details are set forth in order to provide a thorough understanding of the specification. It will be apparent, however, that the specification can be practiced without these specific details. In other instances, structures and devices are shown in block diagram form in order to avoid obscuring the description. For example, the present embodiment is described in some embodiments below primarily with reference to an organizing application that is stored on a user device. However, the present embodiment applies to any type of organizing application that is accessible using a browser.

Reference in the specification to "an embodiment" or "some embodiments" means that a particular feature, structure, or characteristic described in connection with the embodiment is included in at least some embodiments of the description.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms for example "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
receiving, with one or more computing devices, information from heterogeneous data sources, the information including a value automatically generated by a measuring device associated with a first user;
parsing by the one or more computing devices the information to identify a keyword corresponding to a category of subject matter of the first user and the value;
categorizing by the one or more computing devices the information based at least in part on the keyword;
automatically identifying by the one or more computing devices a rule being set by the first user for scheduling a new appointment, the rule specifying a third party service provider and specifying whether to schedule the new appointment with the third party service provider based on the parsed value;
responsive to receiving, parsing and categorizing the information, determining, with the one or more computing devices, whether the information satisfies the rule for scheduling the new appointment;
determining by the one or more computing devices whether the information is matching with an already scheduled appointment in one of a plurality of calendars of the first user;
responsive to the information satisfying the rule for scheduling the new appointment and the information is not matching with the already scheduled appointment, automatically transmitting a message to schedule the new appointment with the third party service provider; and
generating by the one or more computing devices a calendar item for the new appointment in the one of the plurality of calendars of the first user, the one of the plurality of calendars corresponding to the category of subject matter of the first user.

2. The method of claim 1, further comprising determining whether the new appointment can be automatically made and if not, requesting permission from the first user to make the new appointment.

3. The method of claim 1, wherein responsive to the information matching with the already scheduled appointment, further comprising the steps of:
generating the calendar item based on the already scheduled appointment; and
providing, for display, the calendar item to the first user.

4. The method of claim 1, wherein the information includes the social graph and the new appointment is made if the first user is closely related to other people included in the information.

5. The method of claim 1, wherein the information is at least one of an email, information from a social server, the social graph, an instant message, a text message, a chat log, a message from a third party application, a translated voice message, a browsing history, and a search query.

6. The method of claim 1, wherein categorizing the information includes organizing the information into categories defined by the first user.

7. The method of claim 6, wherein the categories include health, family, property, work, pets, and according to a name of each family member.

8. The method of claim 1, wherein responsive to the information not satisfying the rule for scheduling the new appointment, tentatively displaying the calendar item for the new appointment in the one of the plurality of calendars of the first user.

9. The method of claim 1, wherein responsive to the information not satisfying the rule for scheduling the new appointment, generating an alert and providing, for display, the alert to the user, the alert including an option for the user to schedule the new appointment.

10. An apparatus for organizing information comprising:
one or more computer processors;
a parser and categorizer stored on a memory and executable by the one or more computer processors for receiving information from heterogeneous data sources, the information including a value automatically generated by a measuring device associated with a first user, parsing the information to identify a keyword corresponding to a category of subject matter of the first user and the value, categorizing the information based at least in part on the keyword, automatically identifying a rule being set by the first user for scheduling a new appointment, the rule specifying a third party service provider and specifying whether to schedule the new appointment with the third party service provider based on the parsed value, responsive to receiving, parsing and categorizing the information, determining whether the information satisfies the rule for scheduling the new appointment, determining whether the information is matching with an already scheduled appointment in one of a plurality of calendars of the first user, and responsive to the information satisfying the rule for scheduling the new appointment and the information is not matching with the already scheduled appointment, transmitting the information to an appointment manager;
the appointment manager stored on the memory and executable by the one or more computer processors, the appointment manager coupled to the parser and categorizer, the appointment manager for automatically transmitting a message to schedule the new appointment with the third party service provider and transmitting appointment information of the new appointment to a calendar module; and
the calendar module stored on the memory and executable by the one or more computer processors, the calendar module coupled to the parser and categorizer and the appointment manager, the calendar module for generating a calendar item for the new appointment in the one of the plurality of calendars of the first user, the one of the plurality of calendars corresponding to the category of subject matter of the first user.

11. The apparatus of claim 10, wherein the appointment manager also determines whether the new appointment can be automatically made and if not, requesting permission from the first user to make the new appointment.

12. The apparatus of claim 10, wherein responsive to the information is matching with the already scheduled appointment, the calendar module generates the calendar item based on the already scheduled appointment and providing, for display, the calendar item to the first user.

13. The apparatus of claim 10, wherein the information includes the social graph and the new appointment is made if the first user is closely related to other people included in the information.

14. The apparatus of claim 10, wherein the information is at least one of an email, information from a social server, the social graph, an instant message, a text message, a chat log, a message from a third party application, a translated voice message, a browsing history, and a search query.

15. The apparatus of claim 10, wherein the parser and categorizer organizes the information into categories defined by the user.

16. The apparatus of claim 10, wherein responsive to the information not satisfying the rule for scheduling the new appointment, the calendar module tentatively displays the calendar item for the new appointment in the one of the plurality of calendars of the first user.

17. The apparatus of claim 10, wherein responsive to the information not satisfying the rule for scheduling the new appointment, the appointment manager generates an alert and provides, for display, the alert to the user, the alert including an option for the user to schedule the new appointment.

18. The apparatus of claim 10, further comprising a graphical user interface engine that is coupled to the calendar module and the appointment manager, the graphical user interface for generating a user interface for the user to provide rules regarding scheduling of the new appointment.

19. The apparatus of claim 10, wherein the information is an email and further comprising an email engine that is coupled to the parser and organizer, the email engine for receiving the email and transmitting the email to the parser and categorizer.

20. A computer program product comprising a non-transitory computer useable medium including a computer readable program, wherein the computer readable program when executed on a computer causes the computer to:
receive information from heterogeneous data sources, the information including a value automatically generated by a measuring device associated with a first user;
parse the information to identify a keyword corresponding to a category of subject matter of the first user and the value;
categorize the information based at least in part on the keyword;
automatically identify a rule being set by the first user for scheduling a new appointment, the rule specifying a third party service provider and specifying whether to schedule the new appointment with the third party service provider based on the parsed value;
responsive to receiving, parsing and categorizing the information, determine whether the information satisfies the rule for scheduling the new appointment;
determine whether the information is matching with an already scheduled appointment in one of a plurality of calendars of the first user;
responsive to the information satisfying the rule for scheduling the new appointment and the information is not matching with the already scheduled appointment, automatically transmit a message to schedule the new appointment with the third party service provider; and generate a calendar item for the new appointment in the one of the plurality of calendars of the first user, the one of the plurality of calendars corresponding to the category of subject matter of the first user.

* * * * *